(12) United States Patent
Stone et al.

(10) Patent No.: US 8,242,950 B2
(45) Date of Patent: Aug. 14, 2012

(54) SYSTEMS AND METHODS FOR ENHANCING SITUATIONAL AWARENESS OF AN AIRCRAFT ON THE GROUND

(75) Inventors: Cyro A. Stone, Peoria, AZ (US);
Gregory T. Stayton, Peoria, AZ (US);
Charles C. Manberg, Peoria, AZ (US)

(73) Assignee: Aviation Communication & Surveillance Systems, LLC, Phoenix, AZ (US)

( * ) Notice: Subject to any disclaimer, the term of this patent is extended or adjusted under 35 U.S.C. 154(b) by 119 days.

(21) Appl. No.: 11/451,648

(22) Filed: Jun. 12, 2006

(65) Prior Publication Data
US 2007/0080848 A1    Apr. 12, 2007

Related U.S. Application Data

(60) Provisional application No. 60/689,239, filed on Jun. 10, 2005.

(51) Int. Cl.
*G01S 13/00* (2006.01)

(52) U.S. Cl. ............ 342/29; 342/62; 342/455; 701/301; 700/255

(58) Field of Classification Search .............. 342/29–32, 342/62–63, 455; 340/3.41, 901, 961; 367/909; 700/255; 701/301
See application file for complete search history.

(56) References Cited

U.S. PATENT DOCUMENTS

| | | | |
|---|---|---|---|
| 3,993,997 A * | 11/1976 | Jackson | 342/455 |
| 6,195,609 B1 * | 2/2001 | Pilley et al. | 701/120 |
| 6,498,981 B1 | 12/2002 | Adams | |
| 6,535,716 B1 * | 3/2003 | Reichman et al. | 455/12.1 |
| 6,591,171 B1 * | 7/2003 | Ammar et al. | 701/16 |
| 6,614,397 B2 | 9/2003 | Pullen et al. | |
| 7,109,889 B2 | 9/2006 | He | |
| 2002/0080059 A1 | 6/2002 | Tran | |
| 2004/0174295 A1 * | 9/2004 | Stayton et al. | 342/182 |
| 2004/0225432 A1 | 11/2004 | Pilley et al. | |
| 2004/0264583 A1 * | 12/2004 | Ahmed | 375/259 |

* cited by examiner

*Primary Examiner* — Timothy A Brainard
(74) *Attorney, Agent, or Firm* — Allen J. Moss; Squire Sanders (US) LLP

(57) ABSTRACT

A delineated collision avoidance system may comprise a processor for executing one or more instructions that implement one or more functions of the collision avoidance system, a transceiver for transmitting information from and receiving information for the host aircraft, and memory for storing the one or more instructions for execution by the processor to implement the one or more functions of the collision avoidance system to: receive from the transceiver information from another aircraft, generate from the received information a track for the other aircraft, and determine whether the track will intersect within a predefined period of time a region of interest around the host aircraft. In a variation, the system may include a display and the memory may include instructions to: determine whether a predefined condition is satisfied and change an appearance of a symbol shown on the display to indicate that the predefined condition is satisfied.

11 Claims, 4 Drawing Sheets

SYSTEMS AND METHODS FOR ENHANCING SITUATIONAL AWARENESS OF AN AIRCRAFT ON THE GROUND

CROSS REFERENCE TO RELATED APPLICATIONS

This application is related to and claims priority from U.S. application No. 60/689,239, filed Jun. 10, 2005, in the name of the same inventors and having the same title, all of which is incorporated herein by reference.

DESCRIPTION OF THE INVENTION

1. Field of the Invention

The present invention relates to collision avoidance systems and methods, and more particularly, to collision avoidance systems and methods for a host aircraft on the ground.

2. Background of the Invention

Traditionally, flight crews have visually sighted traffic on or near a runway and/or received VHF/UHF communications from air traffic control prior to takeoff to attempt to prevent collisions. There has been no visual or aural indication in the cockpit of other traffic, objects or features on the ground for an independent situational awareness assessment by the flight crew.

As shown in FIG. 1, at times it is difficult if not impossible to see traffic on or near the runway at long distances. Due to the nighttime and foggy conditions depicted in FIG. 1, this aircraft waiting to take off could not see traffic on the ground further down range along the edge of the runway and therefore started its takeoff.

FIG. 2 shows how close the aircraft that was waiting to take off in FIG. 1 came to colliding with the aircraft that was initially unseen to the aircraft taking off. As shown in FIG. 2, the aircraft on the ground is now crossing the runway and its presence is known to the aircraft taking off, however, due to poor visibility, the aircraft taking off did not foresee this collision threat as it waited to take off, as shown in FIG. 1. When this event occurred, the aircraft range at closest point of approach was approximately 80 feet. Moreover, the flight crew had to prematurely climb off the runway and nearly stalled and crashed after missing the aircraft crossing the runway in front of it.

Thus, there is a need for systems and methods that may provide visual and/or aural indications in the cockpit of other traffic, objects or features on the ground for an independent situational awareness assessment by the flight crew.

SUMMARY OF THE INVENTION

In accordance with an embodiment of the invention, a collision avoidance system is disclosed for a host aircraft on the ground, the system comprising a processor for executing one or more instructions that implement one or more functions of the collision avoidance system, a transceiver for transmitting information from and receiving information for the host aircraft, and memory for storing the one or more instructions for execution by the processor to implement the one or more functions of the collision avoidance system to: receive from the transceiver information from another aircraft, generate from the received information a track for the other aircraft, and determine whether the track will intersect within a predefined period of time a region of interest around the host aircraft.

In this embodiment of the invention, the memory may store further instructions for execution by the processor to implement the one or more functions of the collision avoidance system to display on a cockpit display in the host aircraft the track if the track will intersect within the predefined period of time the region of interest around the host aircraft. The memory may store further instructions for execution by the processor to implement the one or more functions of the collision avoidance system to determine whether the track will intersect within another predefined period of time a collision avoidance region of interest around the host aircraft, after the initial determination indicates that the track will intersect within the predefined period of time the region of interest around the host aircraft. The memory may store further instructions for execution by the processor to implement the one or more functions of the collision avoidance system to generate a signal for proving one or more of an aural alert and a visual alert within host aircraft, after the system determines that the track will intersect within the other predefined period of time the collision avoidance region of interest around the host aircraft.

Still referring to this embodiment of the invention, the region of interest around the host aircraft may be larger than or equal to the collision avoidance region of interest around the host aircraft. The determination of whether the track will intersect within the predefined period of time the region of interest around the host aircraft may employ a region of interest around the track. Also, the determination of whether the track will intersect within the other predefined period of time the collision avoidance region of interest around the host aircraft may employ a region of interest around the track. The transceiver may comprise a separate receiver and a separate transmitter. The memory may store further instructions for execution by the processor to implement the one or more functions of the collision avoidance system to display on a cockpit display in the host aircraft ground data that is descriptive of any feature of the ground or any vehicle on the ground.

In accordance with another embodiment of the invention, a collision avoidance system is disclosed for a host aircraft on the ground, the system comprising a processor for executing one or more instructions that implement one or more functions of the collision avoidance system, a transceiver for transmitting information from and receiving information for the host aircraft, a display, and memory for storing the one or more instructions for execution by the processor to implement the one or more functions of the collision avoidance system to: determine whether a predefined condition is satisfied, and change an appearance of a symbol shown on the display to indicate that the predefined condition is satisfied.

In this embodiment of the invention, the determination of whether a predefined condition is satisfied may employ information received by the transceiver. The predefined condition may be any that may affect safe operation of the host aircraft. The symbol may comprise a representation of anything on the ground. The representation of anything on the ground may include one or more of a representation of the host aircraft, a representation of any other aircraft, a representation of any vehicle other than an aircraft, and a representation of any ground feature. The representation of any ground feature may include a representation of anyplace that an aircraft is supposed to go or a representation of anyplace that an aircraft is not supposed to go.

In accordance with yet another embodiment of the invention, a method of operating a collision avoidance system is disclosed for a host aircraft on the ground, the method comprising determining whether a predefined condition is satisfied and changing an appearance of a symbol shown on a display in the host aircraft to indicate that the predefined condition is satisfied.

In this embodiment of the invention, the determination of whether a predefined condition is satisfied may employ information received by a transceiver. The predefined condition may be any that may affect safe operation of the host aircraft. The symbol may comprise a representation of anything on the ground. The representation of anything on the ground may include one or more of a representation of the host aircraft, a representation of any other aircraft, a representation of any vehicle other than an aircraft, and a representation of any ground feature. The representation of any ground feature may include a representation of anyplace that an aircraft is supposed to go or a representation of anyplace that an aircraft is not supposed to go.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Embodiments of the invention may provide flight crews with means to visually and/or aurally detect any vehicle on the ground, e.g., on or near a runway or a taxiway, to provide situational awareness that can be used to prevent vehicle collisions. As used herein, "vehicle" or "vehicles" may refer to any moveable object, such as an aircraft or any ground support equipment. Such situational awareness may similarly be provided for non-moveable objects or features, as well as for any vehicles, objects or features that are not on the ground.

Figure 1:
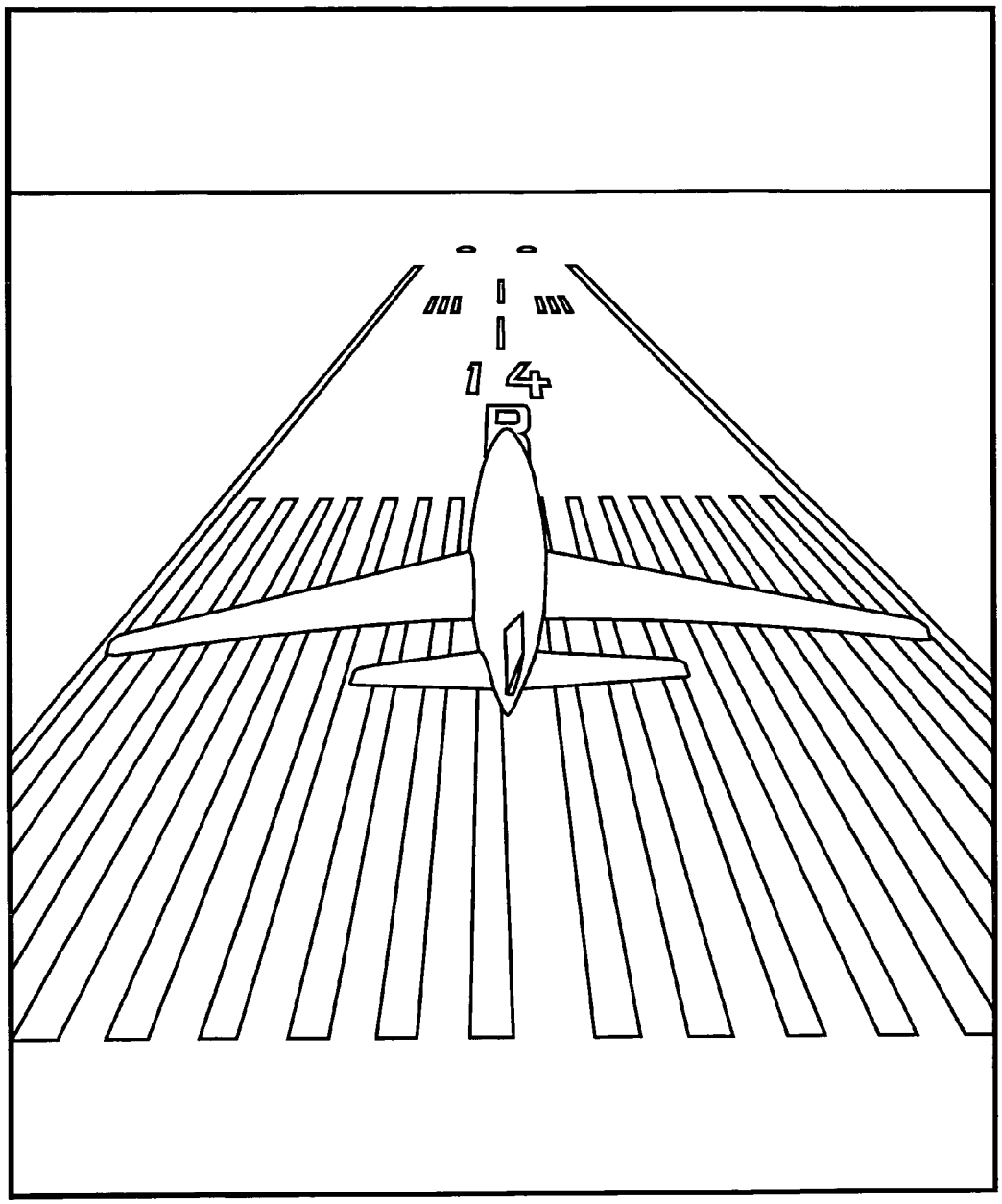
FIG. 1 is a perspective view of an aircraft waiting to take off and not able to see traffic on the ground further down the runway.
Figure 2:
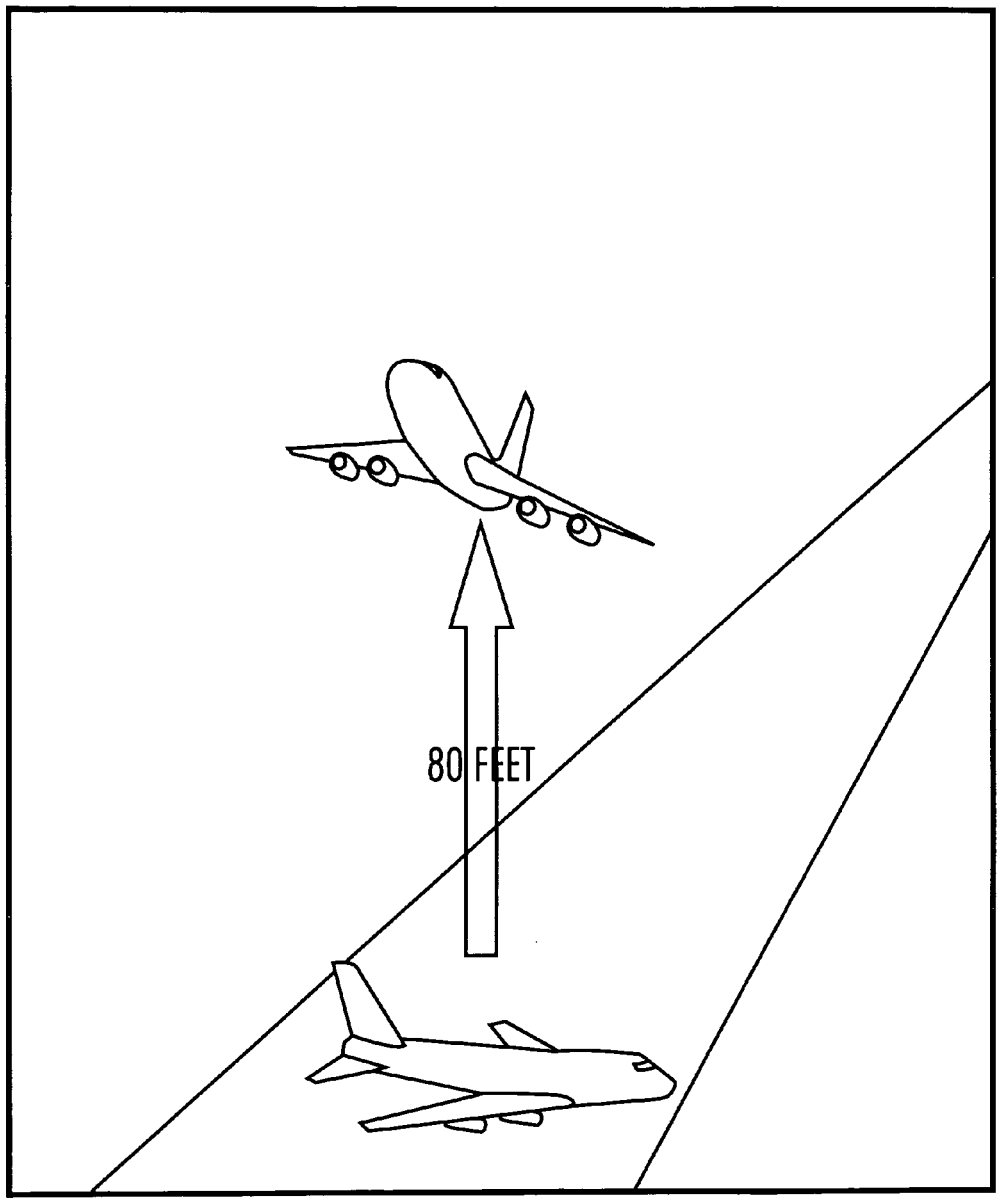
FIG. 2 is a perspective view of the aircraft of FIG. 1, now shown down the runway and dangerously close to another aircraft that intruded on the runway.
Figure 3:
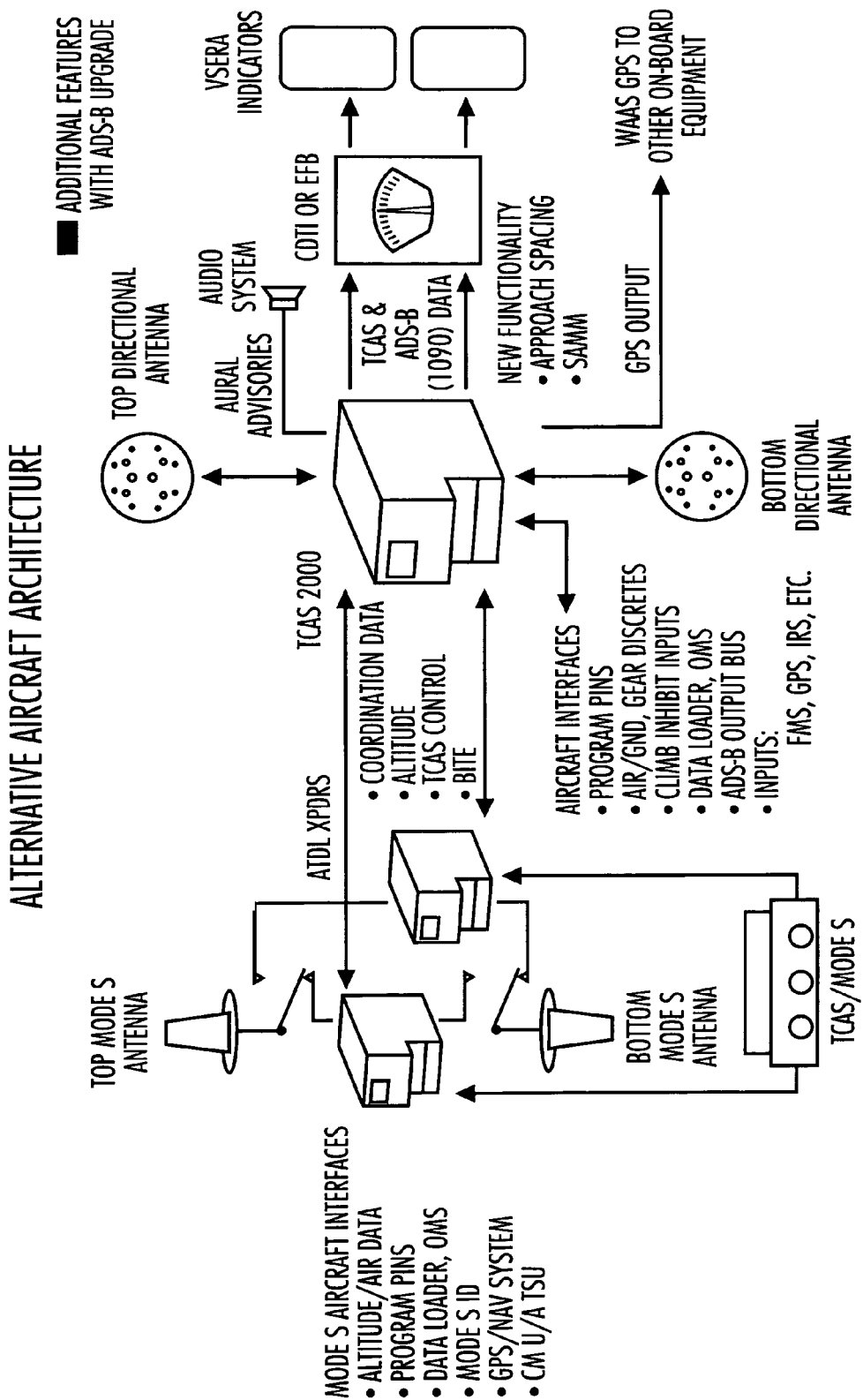
FIG. 3 is a system diagram showing elements of a collision avoidance system that may be employed, in accordance with systems and methods consistent with the present invention.

FIG. 3 shows one possible system that may be used with embodiments of the invention. Mode S transponders can be used between some or all vehicles to send messages about the position of one's own vehicle, e.g., aircraft, to other vehicles. These messages can then be received by a TCAS computer unit and processed to provide a display to the flight crew of the vehicles within a predefined range. A database can also be hosted in the TCAS computer unit or supplied by an external device through an external bus to provide the flight crew with a depiction of airport geography, including but not limited to runways and taxiways.

Figure 4:
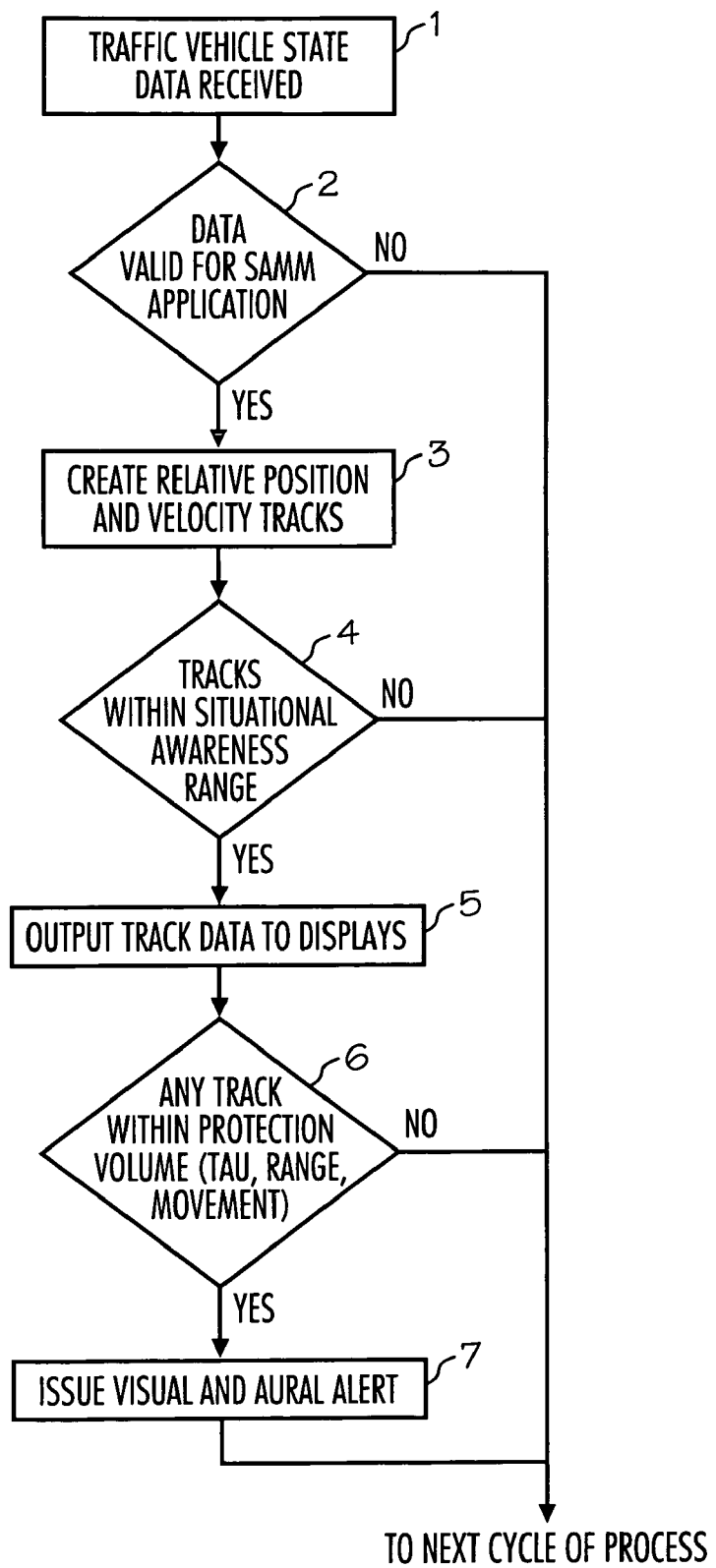
FIG. 4 is a flowchart diagram showing a process that may be employed in a collision avoidance system, in accordance with systems and methods consistent with the present invention.

FIG. 4 depicts a process that may be performed by the system of FIG. 3, however, those skilled in the art understand that variations to the system may be made while still employing the process of FIG. 4. Software to perform the process of FIG. 4 may be stored in memory anywhere in the system and executed by one or more processors.

Referring to FIG. 4, in step 1 the system may receive traffic vehicle state data that may include any data concerning a vehicle that may be relevant to the safety and/or situational awareness of another aircraft receiving such data. For example, this data may include but is not limited to position, velocity, flight identification, altitude, on ground or airborne status, aircraft type, and the like.

In step 2, a determination may be made as to the validity of the received data. For example, the system may evaluate the reasonableness of the data, i.e., is all the data consistent for each scan under normal conditions. Such reasonableness determinations may involve any received data, such as instantaneous acceleration, velocity, update rates and minimum/maximum values. A validity determination may also include an integrity check of any of the received data, i.e., checking that the data is accurate and believable, according to predetermined standards. A validity determination may also verify that data update rates are appropriate under the circumstances, so, for example, data is not too old for a given set of conditions. A validity determination may also verify that data is complete. Data passing selected validity tests may be employed by subsequent steps in the process, however, invalid data is not so used and the process may return to step 1.

In step 3, the system may take own aircraft's position and velocity data and compare this to other aircraft's position and velocity data to determine relative ranges, bearings, and altitudes (for the case where aircraft are airborne) to provide indications to the flight crew of where other aircraft are relative to own aircraft, which can be used to establish tracks for situational awareness purposes. Such processing may employ any suitable algorithm, e.g., a haversine formula or, for close ranges, a latitude/longitude subtraction between own aircraft and other aircraft, to determine the relative position between own aircraft and other aircraft. Velocity information can be used to provide an indication to the flight crew that another aircraft is moving and thus its position is changing relative to a fixed position object, such as a runway or a taxiway, and relative to own aircraft, whether moving or not. For instance, if velocity of own aircraft relative to another aircraft (or of the other aircraft relative to own aircraft) is toward (as opposed to away) from each other, this can be used to enhance situational awareness.

In step 4, the system may determine whether the determined tracks are within a defined situational awareness region, i.e., one that is meaningful for the safety of the flight crew and its passengers and cargo. To this end, a geometric awareness shape could be used. A geometric awareness shape may comprise any desired shape or symbol, such as an elliptical shape. Assuming that an elliptical awareness shape is employed, the major axis thereof may overlap any perceived danger zone, e.g., an active runway. In other words, the geometric awareness shape may be employed to avoid danger and one may select the shape and its manner of employment to focus on areas of perceived danger, while having less of the awareness shape focused on areas of lesser perceived danger. Thus, returning to the elliptical shape example, the major axis thereof may extend down some predefined distance in front of own aircraft when the aircraft is on an active runway or facing the active runway, i.e., an active runway is a perceived danger zone. The minor axis of the elliptical shape may extend some predefined distance, e.g., half the width of the runway, from the side of the aircraft. Alternatively, when an aircraft is not on a runway, e.g., on a taxiway or waiting to enter a runway, the major and minor axes of the awareness ellipse may be reversed. In this way, the major axis of the awareness shape may be focused toward higher perceived threats, e.g., an active runway. If the determined tracks are within a situational awareness region, e.g., a geometric awareness shape, the process may proceed to step 5 for such tracks, and if not, to step 1.

In step 5, the system may provide an output to any annunciating and/or display device which can then provide indications to the flight crew of the surrounding vehicular traffic, objects or features for situational awareness. The annunciating and/or displaying preferably concerns tracks within the situational awareness region, however, those outside this region may similarly be announced and/or displayed.

In step 6, the system may use the information previously provided, e.g., by steps 1 and 3, to evaluate whether the position, movement, track or other spatial criteria of a vehicle, object or feature is within a protection volume around own aircraft. A protection volume can be used, such as an ellipse (if in two dimensions), where own aircraft's course and speed may be used to extend the protection volume along own aircraft's track. This protection geometry can then be used to determine if it overlaps any other aircraft, object or feature (or a similar protection volume for the other aircraft, object or feature) at a Tau or time projected into the future, such as 30 seconds, to determine if a possible collision might occur.

In step 7, the system may examine the output of step 6 and, if an alert is required, provide an aural and/or visual alert to the flight crew to enhance situational awareness in an effort to prevent collision of own aircraft with another vehicle, object or feature.

The process of FIG. 4 may use any data relevant to the purposes of enhancing flight crew situational awareness and aircraft safety, which may include data described above and further include: (1) airport surface area map data—data such as runway location, runway hold lines on the taxiways, etc.; (2) traffic aircraft state data—data such as aircraft position, heading and velocity (ground speed); and (3) own aircraft data—data such as aircraft position, heading, velocity (ground speed).

Display symbols may draw distinction between different types of safety scenarios, e.g., a normal condition for own aircraft, a cautionary condition for own aircraft and a warning condition for own aircraft.

For example, an own aircraft symbol when own aircraft is in a normal condition may comprise a first state, e.g., a predefined shape and/or color (white).

Display symbols for ground traffic, i.e., other vehicles, when in a normal condition, e.g., no active runway encroachment, may comprise a second state, e.g., a predefined shape and/or color (tan).

Display symbols for ground traffic, i.e., other vehicles, when not in a normal condition, e.g., active runway encroachment, may comprise a third state, e.g., a predefined shape and/or color (yellow, signifying a cautionary advisory condition), assuming that own aircraft is on the active runway, but stopped. Similarly, display symbols for ground traffic, i.e., other vehicles, when not in a normal condition, e.g., own aircraft has crossed a runway "Hold Short" IFR line on the taxiway and the ground traffic is on the active runway with no velocity, may comprise a third state, e.g., a predefined shape and/or color (yellow, signifying a cautionary advisory condition). In such cases, the display of the runway itself may also, or alternatively, change appearance to draw the attention of the flight crew, e.g., the displayed runway may be highlighted or outlined in yellow and/or start blinking.

Display symbols for ground traffic, i.e., other vehicles, when not in a normal condition, e.g., active runway encroachment, may comprise a fourth state, e.g., a predefined shape and/or color (red, signifying a warning advisory condition), assuming that own aircraft is on the active runway, but not stopped, e.g., taking off. Similarly, display symbols for ground traffic, i.e., other vehicles, when not in a normal condition, e.g., when own aircraft crosses the runway "Hold Short" IFR line on the taxiway and the ground traffic is on the active runway and not stopped, may comprise a fourth state, e.g., a predefined shape and/or color (red, signifying a warning advisory condition). In such cases, the display of the runway itself may also, or alternatively, change appearance to draw the attention of the flight crew, e.g., the displayed runway may be highlighted or outlined in red and/or start blinking.

An active runway may also be displayed with a unique predefined characteristic. For example, an active runway may be highlighted in yellow or in a yellow outline (a cautionary advisory condition) when own aircraft is pointed towards the runway and is behind or crosses the runway "Hold Short" IFR line on the taxiway and traffic is on the active runway with no velocity. Similarly, an active runway may be highlighted in red or in a red outline (a warning advisory condition) when own aircraft is pointed towards the runway and is behind or crosses the runway "Hold Short" IFR line on the taxiway and traffic is on the active runway with velocity.

Accordingly, the system may provide aural and/or visual indications to enhance the situational awareness and safety of own aircraft relative to other vehicles, objects or features, whether moving or not and whether on the ground or not.

For example, when own aircraft is on an active runway with no velocity and traffic crosses the active runway "Hold Short" IFR line for that runway, the display symbol for the traffic may assume a predefined shape and/or color (yellow, signifying a cautionary advisory condition). The display symbol for the traffic can change back to a predefined shape and/or color (tan, signifying a normal condition) when it returns to a safe position, such as after own aircraft has passed by the traffic or when the traffic has crossed and is moving away from the runway.

When own aircraft is on an active runway with a velocity and traffic crosses the active runway "Hold Short" IFR line for that runway, the display symbol for the traffic may assume a predefined shape and/or color (red, signifying a warning advisory condition). The display symbol for the traffic can change back to a predefined shape and/or color (tan, signifying a normal condition) when it returns to a safe position, such as after own aircraft has passed by the traffic or when the traffic has crossed and is moving away from the runway.

When own aircraft is on a taxiway that is pointing towards an active runway and own aircraft is behind the active runway "Hold Short" IFR line and traffic is on the active runway with no velocity, the display symbol for the traffic may assume a predefined shape and/or color (yellow, signifying a cautionary advisory condition). Similarly, in such a condition, the display symbol for the active runway may also assume a predefined shape and/or color (yellow highlight or yellow outline, signifying a cautionary advisory condition). Once the traffic crosses a predefined safety threshold, e.g., a set altitude above the ground after takeoff, the display symbol for the traffic and/or the active runway may return to a normal indication.

When own aircraft is on a taxiway that is pointing towards an active runway and own aircraft is behind the active runway "Hold Short" IFR line and traffic is on the active runway with velocity, the display symbol for the traffic may assume a predefined shape and/or color (red, signifying a warning advisory condition). Similarly, in such a condition, the display symbol for the active runway may also assume a predefined shape and/or color (red highlight or red outline, signifying a warning advisory condition). Once the traffic crosses a predefined safety threshold, e.g., a set altitude above the ground after takeoff, the display symbol for the traffic and/or the active runway may return to a normal indication.

When own aircraft is on a taxiway that is pointing towards an active runway and own aircraft crosses the runway "Hold Short" IFR line and traffic is on the active runway with no velocity, the display symbol for the traffic may assume a predefined shape and/or color (yellow, signifying a cautionary advisory condition). Similarly, in such a condition, the display symbol for the active runway may also assume a predefined shape and/or color (yellow highlight or yellow outline, signifying a cautionary advisory condition). Once the traffic crosses a predefined safety threshold, e.g., a set altitude above the ground after takeoff, the display symbol for the traffic and/or the active runway may return to a normal indication.

When own aircraft is on a taxiway that is pointing towards an active runway and own aircraft crosses the runway "Hold Short" IFR line and traffic is on the active runway with velocity, the display symbol for the traffic may assume a predefined shape and/or color (red, signifying a warning advisory condition). Similarly, in such a condition, the display symbol for the active runway may also assume a predefined shape and/or color (red highlight or yellow outline, signifying a warning advisory condition). Once the traffic crosses a predefined safety threshold, e.g., a set altitude above the ground after takeoff, the display symbol for the traffic and/or the active runway may return to a normal indication.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A collision avoidance system for a host aircraft, the system comprising:
   a processor for executing one or more instructions that implement one or more functions of the collision avoidance system;
   a transceiver for transmitting information from and receiving information for the host aircraft; and
   memory for storing the one or more instructions for execution by the processor to implement the one or more functions of the collision avoidance system to:
      receive from the transceiver information from another aircraft;
      generate from the received information a track for the other aircraft; and
      determine whether the track will intersect, within a predefined period of time, a region of interest around the host aircraft, wherein at least one boundary of the region of interest is at least partially based on a geographical feature.

2. The collision avoidance system of claim 1 wherein the memory stores further instructions for execution by the processor to implement the one or more functions of the collision avoidance system to display on a cockpit display in the host aircraft the track if the track will intersect within the predefined period of time the region of interest around the host aircraft.

3. The collision avoidance system of claim 2 wherein the memory stores further instructions for execution by the processor to implement the one or more functions of the collision avoidance system to determine whether the track will intersect within another predefined period of time a collision avoidance region of interest around the host aircraft, after the initial determination indicates that the track will intersect within the predefined period of time the region of interest around the host aircraft.

4. The collision avoidance system of claim 3 wherein the memory stores further instructions for execution by the processor to implement the one or more functions of the collision avoidance system to generate a signal for proving one or more of an aural alert and a visual alert within host aircraft, after the system determines that the track will intersect within the other predefined period of time the collision avoidance region of interest around the host aircraft.

5. The collision avoidance system of claim 3 wherein the region of interest around the host aircraft is larger than the collision avoidance region of interest around the host aircraft.

6. The collision avoidance system of claim 3 wherein the region of interest around the host aircraft is the same as the collision avoidance region of interest around the host aircraft.

7. The collision avoidance system of claim 3 wherein the determination of whether the track will intersect within the other predefined period of time the collision avoidance region of interest around the host aircraft employs a region of interest around the track.

8. The collision avoidance system of claim 1 wherein the determination of whether the track will intersect within the predefined period of time the region of interest around the host aircraft employs a region of interest around the track.

9. The collision avoidance system of claim 1 wherein the transceiver comprises a separate receiver and a separate transmitter.

10. The collision avoidance system of claim 1 wherein the memory stores further instructions for execution by the processor to implement the one or more functions of the collision avoidance system to display on a cockpit display in the host aircraft ground data that is descriptive of any feature of the ground or any vehicle on the ground.

11. The system of claim 1, wherein the geographical feature includes at least one of: a runway and a taxiway.

* * * * *